United States Patent
Isogai et al.

(10) Patent No.: US 8,537,574 B2
(45) Date of Patent: Sep. 17, 2013

(54) POWER SOURCE CONTROLLING SEMICONDUCTOR INTEGRATED CIRCUIT AND INSULATED DIRECT-CURRENT POWER SOURCE DEVICE

(75) Inventors: Taro Isogai, Tama (JP); Yuji Yamanaka, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 313 days.

(21) Appl. No.: 13/027,461

(22) Filed: Feb. 15, 2011

(65) Prior Publication Data

US 2011/0205770 A1  Aug. 25, 2011

(30) Foreign Application Priority Data

Feb. 24, 2010 (JP) ................. 2010-038267

(51) Int. Cl.
*H02M 3/335* (2006.01)

(52) U.S. Cl.
USPC .................. 363/21.12; 363/21.15

(58) Field of Classification Search
USPC .......... 363/21.04, 21.07, 21.08, 21.09, 21.12, 363/21.15, 21.16, 21.17
See application file for complete search history.

(56) References Cited

U.S. PATENT DOCUMENTS

| 6,141,232 A * | 10/2000 | Weinmeier et al. ............. 363/97 |
| 6,366,479 B1 * | 4/2002 | Usui et al. .................. 363/21.12 |
| 7,535,736 B2 * | 5/2009 | Nakamura et al. ......... 363/21.16 |
| 2006/0044845 A1 * | 3/2006 | Fahlenkamp et al. ...... 363/21.15 |

FOREIGN PATENT DOCUMENTS

JP  2004-527138 A  9/2004

\* cited by examiner

*Primary Examiner* — Nguyen Tran
(74) *Attorney, Agent, or Firm* — Holtz, Holtz, Goodman & Chick, PC

(57) ABSTRACT

A power source controlling IC controlling a current flown through the primary side winding of a transformer is provided with an external terminal to which a detected voltage from the secondary side is fed back through a photocoupler; a control circuit generating and outputting a control signal of a switching element controlling the current according to an input voltage; a voltage generating circuit generating an internal reference voltage based on the input voltage; a pull-up section connected to the terminal to pull up the potential of the terminal to the internal reference voltage to give a bias voltage to a light receiving element of the photocoupler; and a voltage comparing circuit comparing the voltage of the external terminal and a predetermined reference voltage, wherein the control circuit stops outputting the control signal based on the output of the first voltage comparing circuit when detecting an abnormality.

10 Claims, 7 Drawing Sheets

POWER SOURCE CONTROLLING SEMICONDUCTOR INTEGRATED CIRCUIT AND INSULATED DIRECT-CURRENT POWER SOURCE DEVICE

1. FIELD OF THE INVENTION

The present invention relates to a technique effective for being used in an insulated direct-current (DC) power source device equipped with a voltage converting transformer and a power source controlling semiconductor integrated circuit constituting the insulated DC power source device.

2. DESCRIPTION OF RELATED ART

DC power source devices include an insulated AC-DC converter composed of a diode bridge circuit rectifying an alternating-current (AC) power source voltage, a DC-DC converter stepping down the DC voltage rectified by the diode bridge circuit to convert the DC voltage into that of a desired potential, and the like. As the insulated AC-DC converter, for example, a switching power source device is known which controls the voltage induced in the secondary side winding thereof by performing the switching control of the current flowing through the primary side winding of the voltage converting transformer thereof.

Now, the voltages of AC power sources are different in countries and districts, and a power source controlling semiconductor integrated circuit constituting an AC-DC converter is desired to be able to deal with various AC power source voltages. In addition, an AC-DC converter sometimes changes its power factor according to its load. An AC-DC converter provided with a power factor improving circuit (PFC) on the primary side thereof in addition to a switching power source device in order to raise the power factor of the AC-DC converter has accordingly been put to practical use conventionally.

The AC-DC converter provided with this power factor improving circuit (PFC), however, needs many integrated circuits (ICs) and external parts, and brings about an increase in cost. On the other hand, an invention of forming a power factor improving control circuit (PFC) and a control circuit of a switching power source on one semiconductor chip as a semiconductor integrated circuit was also proposed (see, for example, Japanese Unexamined Patent Application Publication (Translation of PCT Application) No. 2004-527138, which will hereinafter be referred to as Patent Document 1).

FIG. 7 shows the configuration of the power source device disclosed in Patent Document 1. The power source device disclosed in Patent Document 1 generates a light emitting diode (LED) driving power source voltage. The power source device for an LED incorporates a PFC function into a controlling semiconductor integrated circuit 128 in order to keep a good power factor even when the number of LEDs connected to the output terminal thereof changes. In addition, the power source device is adapted to detect the current on the secondary side to feed back the information of the current to the controlling IC 128 through a photocoupler 132 in order to perform the on-off drive of a switching element Q1 according to the current flowing through LEDs 126 as loads to control the current flowing through the primary side coil of a transformer 124.

Now, it is desirable to provide a protection function to a power source device for an LED composed of an AC-DC converter for protecting the circuits constituting the power source device in the case where the output terminals on the secondary side become open (output overvoltage) owing to the removal of LEDs as loads or the like, the case where the output terminals on the secondary side become a short circuit state owing to a failure of the LEDs, the case where an input on the primary side becomes an overpower state, and the like. In particular, the LEDs are each composed of a semiconductor element, and the out terminals of the AC-DC converter become open or the output terminals on the secondary side become a short circuit state owing to failures, such as a junctional disruption by the application of an overvoltage equal to or more than the rated voltage thereof, the deterioration of an electrode, and a snapping of a wire caused by an impact. The provision of the protection function is consequently extremely important. The power source device disclosed in Patent Document 1 does, however, not equipped with any protection function described above.

In addition, the power source device disclosed in Patent Document 1 is adapted to generate the power source voltage of the transistor on the light receiving side which transistor constitutes the photocoupler 132 by converting an alternating current induced in an auxiliary winding W5 provided in the transformer 124 into a direct current with a diode D3 and a capacitor C4. Because the photocoupler 132 does, consequently, not effectively function at a time immediately after a start of the power source when no alternating currents are induced in the auxiliary winding W5, if a protection circuit against the short circuit state of the output on the secondary side is incorporated in the controlling IC 128, it is needed to invalidate the signals of the light receiving transistor of the photocoupler 132 at a start of the power source in order to evade the malfunctions of the protection circuit at the start of the power source. The power source device has a problem in which the protection function against the short circuit state of the output on the secondary side, thereby, becomes the state of not working at the time of the start of the power source.

Furthermore, if a conventional general technique of detecting an overvoltage of an output on a secondary side for protection is applied to the power source device disclosed in Patent Document 1 to incorporate an overvoltage protection circuit into the controlling IC 128, it becomes necessary to separately provide a photocoupler 133, a regulator 134 generating the power source voltage of the photocoupler 133, and the like, as shown by broken lines in FIG. 7. The power source device, consequently, has another problem of the increase of the number of parts to disturb the miniaturization of the device.

SUMMARY OF THE INVENTION

It is an object of the present invention to provide a power source controlling IC suitable for constituting an insulated DC power source device equipped with a voltage converting transformer, the IC having a protection function against an abnormal state occurring in the power source device without increasing the number of parts, and a compact DC power source device using the power source controlling IC.

In order to attain the object mentioned above, an aspect of the present invention is a power source controlling semiconductor integrated circuit to control a current flowing through a primary side winding of a voltage converting transformer of an insulated DC power source device having the transformer, the circuit including: a first external terminal to which a detected voltage from a secondary side of the transformer is fed back through a photocoupler; a control circuit to generate and output a control signal of a switching element to control the current flowing through the primary side winding according to the voltage of the first external terminal and an input voltage applied to a terminal of the primary side winding of the transformer; a voltage generating circuit to generate an internal reference voltage based on the input voltage applied to the terminal of the primary side winding of the transformer; a pull-up section to be connected to the first external terminal to pull up a potential of the first external terminal to the internal reference voltage to enable giving a bias voltage to a light receiving element of the photocoupler, externally connected to the first external terminal; and a first voltage comparing circuit having one input terminal connected to the first external terminal and another input terminal to which a first reference voltage is applied, wherein the control circuit is adapted to stop outputting the control signal based on an output of the first voltage comparing circuit when the voltage of the first external terminal is lower or higher than the first reference voltage.

According to the configuration mentioned above, when an insulated DC power source device equipped with a voltage converting transformer is configured, switching control of a good power factor can be performed with one power source controlling IC, and a protection function of stopping the operation of the DC power source device by detecting abnormal states, such as a short circuit of the output terminals on the secondary side, can be realized without increasing the number of the parts of the device while evading malfunctions of a start of the power source device.

The power source controlling semiconductor integrated circuit is preferably configured, here, to include a second voltage comparing circuit having one input terminal connected to the first external terminal and another input terminal to which a second reference voltage of a potential higher than that of the first reference voltage is applied, wherein the control circuit is adapted to stop outputting the control signal based on outputs of the first and second voltage comparing circuits when the voltage of the first external terminal is lower than the first reference voltage or higher than the second reference voltage.

It is thereby possible to realize a protection function of detecting abnormal states of the output terminals on the secondary side, such as the opening of the terminals, besides a short circuit of the terminals only by monitoring one feedback terminal.

In addition, the power source controlling semiconductor integrated circuit preferably includes a delay circuit to delay the output of the second voltage comparing circuit, wherein the control circuit is adapted to delay stop control of the outputting in response to a signal from the delay circuit when the voltage of the first external terminal is judged to be higher than the second reference voltage by the second voltage comparing circuit. Thereby, a protection function of stopping the operation of the power source device by detecting abnormal states, such as the opening of the output terminals on the secondary side, can be realized while evading malfunctions of a start of the power source device.

The power source controlling semiconductor integrated circuit, preferably, further includes: a second external terminal to which a voltage in proportion to the input voltage is input; a third external terminal to which a voltage according to the current flowing through the primary side winding of the transformer is input; a level shift circuit to output a voltage in inverse proportion to the voltage of the second external terminal; and a third voltage comparing circuit to detect an overpower state of an input by comparing the output voltage of the level shift circuit and the voltage of the third external terminal, wherein the control circuit is adapted to stop outputting the control signal based on an output of the third voltage comparing circuit when the voltage of the third external terminal is higher than the output voltage of the level shift circuit. Both of the switching control for improving the power factor of the power source device and the detection of an input overpower state can thereby be performed on the basis of the voltage of a common external terminal, and the number of the terminals of the power source controlling IC can be decreased.

Another aspect of the present invention is an insulated direct-current power source device, including: a diode bridge circuit to rectify an alternating-current voltage to convert the voltage into a direct-current voltage; a voltage converting transformer having a primary side winding to which the voltage rectified by the diode bridge circuit is input; a power source controlling semiconductor integrated circuit having a configuration according to claim 1 to control the current in the primary side winding of the transformer; a smoothing capacitor connected between terminals of a secondary side winding of the transformer; a rectifying section capable of charging the smoothing capacitor by converting an alternating current induced in the secondary side winding of the transformer into a direct current; an output current detecting circuit to detect a current flowing through a load connected to a secondary side of the transformer and output a signal according to the detected current; and a photocoupler including a light emitting element to be lighted and driven according to an output of the output current detecting circuit and a light receiving element to receive a light of the light emitting element to make a current according to a light quantity flow, wherein the light receiving element of the photocoupler is adapted to be connected between the first external terminal of the power source controlling semiconductor integrated circuit and a ground point, so that a bias voltage is given to the light receiving element through the pull-up section.

According to the configuration mentioned above, a compact DC power source device can be realized which can perform switching control of a good power factor with one power source controlling IC, and which has a protection function of stopping the operation of the power source device by detecting abnormal states, such as a short circuit of the output terminals on the secondary side, while evading malfunctions of a start of the power source device.

In addition, the insulated direct-current power source device is, preferably, includes: the power source controlling semiconductor integrated circuit further provided with a second voltage comparing circuit having one input terminal connected to the first external terminal and another input terminal to which a second reference voltage of a potential higher than that of the first reference voltage is applied; an output voltage detecting circuit to detect whether a charged voltage of the smoothing capacitor is higher than a predetermined voltage or not, the output voltage detecting circuit provided on the secondary side; and a photocoupler including a light emitting element to be lighted and driven according to an output of the output current detecting circuit and an output of the output voltage detecting circuit, and a light receiving element to receive a light of the light emitting element to make a current according to a light quantity flow, the photocoupler provided between the secondary side and the primary side, wherein the light receiving element of the photocoupler can be adapted to be connected between the first external terminal of the power source controlling semiconductor integrated circuit and a ground point, so that a bias voltage is given to the light receiving element through the pull-up section.

A compact DC power source device can thereby be realized which can perform switching control of a good power factor with one power source controlling IC, and which can achieve a protection function of stopping the operation of the power source device by detecting abnormal states, such as a short circuit of the output terminals on the secondary side and the opening of the output terminals, while evading malfunctions of a start of the power source device, by transmitting a signal from the secondary side to the power source controlling IC with one photocoupler.

In addition, the output current detecting circuit is, preferably, adapted to include a voltage generating section to generate a reference voltage capable of changing a generated voltage and an error amplifying circuit having a first input terminal to which a voltage obtained by converting an output current by a resistor is applied, and a second input terminal to which the reference voltage is applied, and to change an output current by changing the reference voltage generated by the voltage generating section. A compact DC power source device for an LED can thereby be realized which power source device can easily perform the light control of an illuminating light source, such as an LED, when the load of the power source device is the illuminating light source.

The present invention has an effect of being able to realize a power source controlling IC and a compact DC power source device using the IC that is suitable for constituting an insulated DC power source device equipped with a voltage converting transformer and that is equipped with a protection function against abnormal states occurring in the power source device without increasing the number of the parts thereof.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, a suitable embodiment of the present invention will be described with reference to the accompanying drawings.

Figure 1:
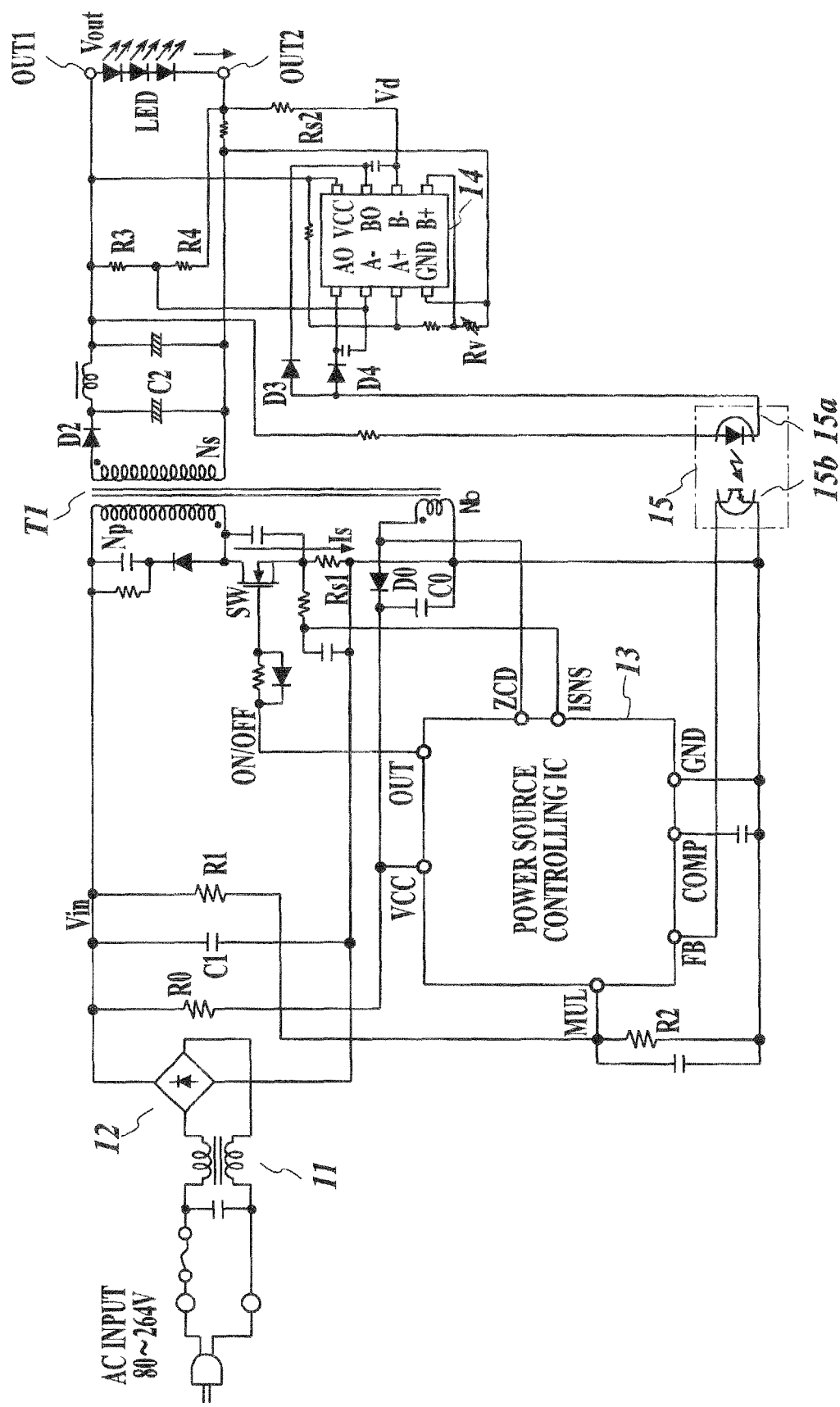
FIG. 1 is a circuit configuration diagram showing an embodiment of an insulated AC-DC converter as a DC power source device using a switching power source device to which the present invention is effectively applied.

FIG. 1 is a circuit configuration diagram showing an embodiment of an insulated AC-DC converter as a DC power source device using a switching power source device to which the present invention is applied. Incidentally, although a power source device driving LEDs as loads will be shown to be described in this embodiment, the loads of the DC power source devices to which the present invention can be applied are not limited to the LEDs.

The DC power source device 10 of this embodiment includes a noise breaking filter 11 made of a common mode coil or the like; a diode bridge circuit 12 rectifying an alternating-current (AC) voltage to convert the AC voltage into a DC voltage; a smoothing capacitor C1; a voltage converting transformer T1 including a primary side winding Np, an auxiliary winding Nb, and a secondary side winding Ns; a switching transistor SW made of an N-channel metal-oxide semiconductor (MOS) field effect transistor (FET) and connected to the primary side winding Np of the transformer T1 in series therewith; and a power source controlling circuit 13 driving the switching transistor SW. In this embodiment, the power source controlling circuit 13 is formed as a semiconductor integrated circuit (power source controlling IC) on one semiconductor chip made of single crystal silicon or the like.

On the secondary side of the transformer T1, the transformer T1 is provided with a rectifying diode D2 connected to the secondary side winding Ns in series therewith and a smoothing capacitor C2 connected between the cathode terminal of the diode D2 and the other terminal of the secondary side winding Ns. The transfer T1 outputs a DC voltage Vout in proportion to the turns ratio between the primary side winding Np and the secondary side winding Ns by rectifying and smoothing an AC voltage induced in the secondary side winding Ns by making a current flow through the primary side winding Np intermittently. Four light emitting diodes (LEDs) are connected in series between output terminals OUT1 and OUT2 as loads.

The DC power source device 10 is, furthermore, provided with output dividing resistors R3 and R4 connected in series between the output terminals OUT1 and OUT2 in order to detect the output voltage Vout; a sense resistor Rs2 for detecting a current flowing through the LEDs, which are loads; and a detecting IC 14 incorporating an amplifier outputting a voltage according to a detected current value, a comparator detecting whether the output voltage Vout is equal to or more than a predetermined level or not; and the like.

In addition, on the primary side of the DC power source device 10 of the embodiment, the DC power source device 10 is provided with a rectifying diode D0 connected in series with the auxiliary winding Nb and a smoothing capacitor C0 connected between the cathode terminal of the diode D0 and a ground potential point. On the primary side, a smoothed voltage is applied to the power source voltage terminal VCC of the power source controlling IC 13. The power source controlling IC 13 is configured in order to be able to operate before the induction of a voltage in the auxiliary winding Nb at the time of a power source start by applying the voltage rectified by the diode bridge circuit 12 and applied to one terminal of the primary side winding Np to the power source voltage terminal VCC of the power source controlling IC 13 through a resistor R0 together with the application of the smoothed voltage to the power source voltage terminal VCC. Incidentally, the winding method of the coil of the auxiliary winding Nb is set to be the same method as that of the secondary side winding Ns in order that a voltage having the same waveform as that of a voltage induced on the secondary side may be induced.

A photocoupler 15 is, then, provided between the primary side and the secondary side and composed of a photodiode 15a driven by the output of the detecting IC 14 and transmitting a feedback signal to the power source controlling IC 13, and a light receiving transistor 15b.

Figure 2:
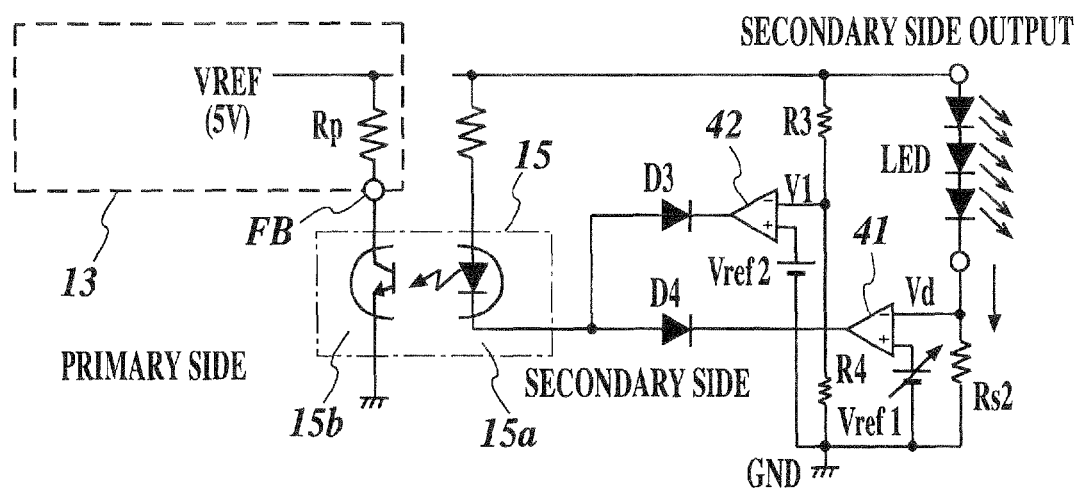
FIG. 2 is a circuit configuration diagram showing a circuit configuration example of a detecting IC 14 to be provided on the secondary side of a transformer in the insulated AC-DC converter of FIG. 1 and a bias system of a photocoupler.

FIG. 2 shows a circuit configuration example of the detecting IC 14, provided on the secondary side of the transformer T1, and a bias system of the photocoupler 15 of the present embodiment.

In the present embodiment, the light receiving transistor 15b, constituting the photocoupler 15, has an emitter terminal connected to the ground potential GND, and a collector terminal connected to the feedback terminal FB of the power source controlling IC 13, provided on the primary side. The feedback terminal FB is, then, adapted to be pulled up by being connected through a pull-up resistor Rp to a terminal to which a reference voltage VREF generated by an internal power source circuit provided in the power source controlling IC 13 is applied.

The detecting IC 14 is, as shown in FIG. 2, provided with an error amplifier 41 outputting a voltage according to a potential difference between a detected voltage Vd subjected to a current-voltage conversion by the sense resistor Rs2 and a reference voltage VREF1, and a comparator 42 comparing a voltage V1 which is a divided output voltage Vout with the resistors R3 and R4 and a reference voltage VREF2 to detect whether the output voltage Vout is equal to or more than the predetermined level or not. The output terminals of the error amplifier 41 and the comparator 42 are, then, connected to the cathode terminal of the photodiode 15a, constituting the photocoupler 15, through backflow preventing diodes D4 and D3, respectively, and the photodiode 15a is adapted to be lighted by the suction of current by the detecting IC 14 through the diode D3 or D4.

In addition, the detecting IC 14 is adapted to be able to adjust the brightness of the LEDs by changing the reference voltage VREF1, input into the error amplifier 41, by changing the resistance value of an externally connected resistor Rv (see FIG. 1). To put it concretely, when the reference voltage VREF1 is reduced, then the output voltage of the error amplifier 41 decreases, and it is informed to the power source controlling IC 13 through the photocoupler 15 that the current flowing through the LEDs is large. The power source controlling IC 13 accordingly controls the switching transistor SW in order to decrease the current flowing through the LEDs. In addition, when the reference voltage VREF1 is raised, the output voltage of the error amplifier 41 increases, and it is informed to the power source controlling IC 13 through the photocoupler 15 that the current flowing through the LEDs is small. The power source controlling IC 13 accordingly controls the switching transistor SW in order to increase the current flowing through the LEDs.

When the output voltage Vout, furthermore, becomes equal to or higher than a predetermined value owing to, for example, the removal of the LEDs to cause an opened state between the output terminals OUT1 and OUT2, then the output voltage of the comparator 42 changes to a low level and makes a current flow through the light emitting diode 15a of the photocoupler 15 to the limit thereof. Then, the voltage of the feedback terminal FB of the power source controlling IC 13 becomes lower than a relatively low voltage, e.g. 0.5 V, owing to the voltage drop of the pull-up resistor Rp, and the power source controlling IC 13 is adapted to detect the voltage lowering of the feedback terminal FB to stop the on-off drive control of the switching transistor SW.

In addition, when the light control of the LEDs is considerably narrowed down in the power source device provided with a light control function, it is apprehended that the detecting IC 14 cannot operate owing to the lowering of the output voltage Vout. The DC power source device 10 is, however, configured to be able to evade abnormal operation, such as the blinking of the LEDs, by the operation of the power source controlling IC 13 to detect the lowering of the potential of the feedback terminal FB according to the light control at the time of the lowering of the potential to be lower than the threshold value in the IC 13, set to the potential lower than 0.5 V as described above, and to stop the on-off drive control of the switching transistor SW and stop the switching operation before the detecting IC 14 enters an operating limit region.

In addition, when the output terminals OUT1 and OUT2 on the secondary side become a short circuit, the output voltage Vout on the secondary side lowers. Consequently, the output level of the comparator 42 changes to a high level, and the voltage difference over the sense resistor Rs2 becomes zero to raise the output voltage of the error amplifier 41. The light emitting diode 15a of the photocoupler 15 is, thus, put out. In addition, when a connection wiring of the photocoupler 15 on the secondary side is cut off, the light emitting diode 15a of the photocoupler 15 is also put out. The current flowing through the light receiving transistor 15b and the pull-up resistor Rp thereby decreases, and the voltage of the feedback terminal FB of the power source controlling IC 13 is raised to the internal reference voltage VREF through the pull-up resistor Rp. As a result, the power source controlling IC 13 operates to stop the on-off drive control of the switching transistor SW.

As described above, according to the AC-DC converter of the present embodiment, various abnormalities can be detected only by providing one photocoupler, and the number of the parts thereof can be decreased to enable the miniaturization of the device.

Figure 7:
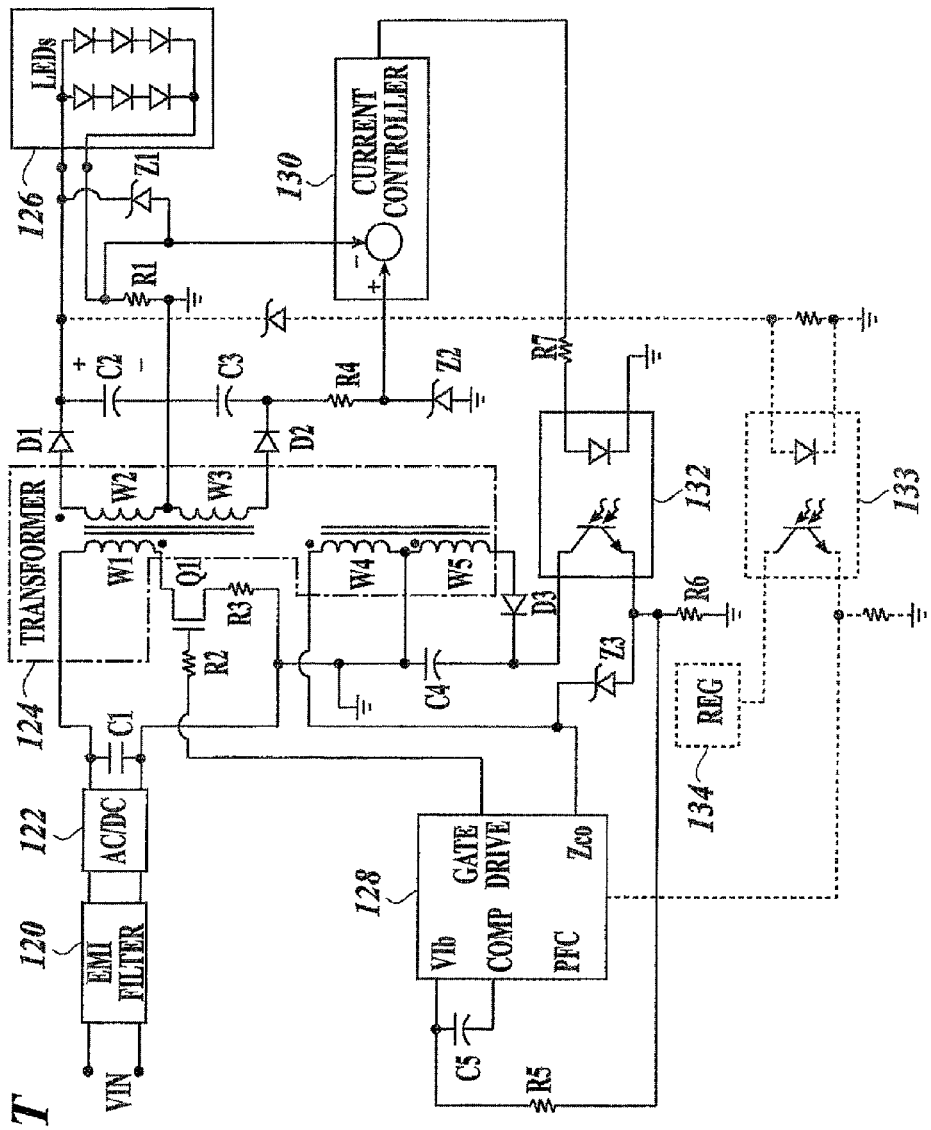
FIG. 7 is a circuit configuration diagram showing a configuration example of an insulated AC-DC converter of a conventional one-converter system.

In addition, because the conventional power source device shown in FIG. 7 generates the power source voltage of the transistor constituting the photocoupler 132 on the light receiving side by converting the alternating current induced in an auxiliary winding W5 provided in the transformer 124 into a direct current with the diode D3 and the capacitor C4, the photocoupler 132 does not effectively function at a time immediately after a power source start when no alternating current is induced in the auxiliary winding W5. That is, the potential of the feedback terminal is made to the ground potential at a time immediately after power activation of the AC power source in the case of the system of giving a bias voltage to the light receiving transistor of the photocoupler 132 as shown in FIG. 7. If a protection circuit against the short circuit state of the output on the secondary side is incorporated in the controlling IC 128, it consequently becomes necessary to invalidate the function of the protection circuit power at a time immediately after a start of the power source in order to evade the malfunctions of the protection circuit at the time of the power source start, and the conventional power source device has a problem in which the protection function against the short circuit state of the output on the secondary side does not operate at the time of a power source start.

On the contrary, in the AC-DC converter of the present embodiment, the collector of the light receiving transistor 15b is connected to the feedback terminal FB of the power source controlling IC 13, and the internal reference voltage VREF is applied to the feedback terminal FB through the pull-up resistor Rp in the power source controlling IC 13. When an input voltage is input into the power source controlling IC 13 at the time of a power source start, the internal reference voltage VREF is, consequently, generated rapidly, and the feedback terminal FB is pulled up even when no signal is input from the photocoupler 15. The AC-DC converter has an advantage that the converter does not malfunction at the time of a power source start and the function of the protection circuit is not required to be invalidated.

Figure 3:
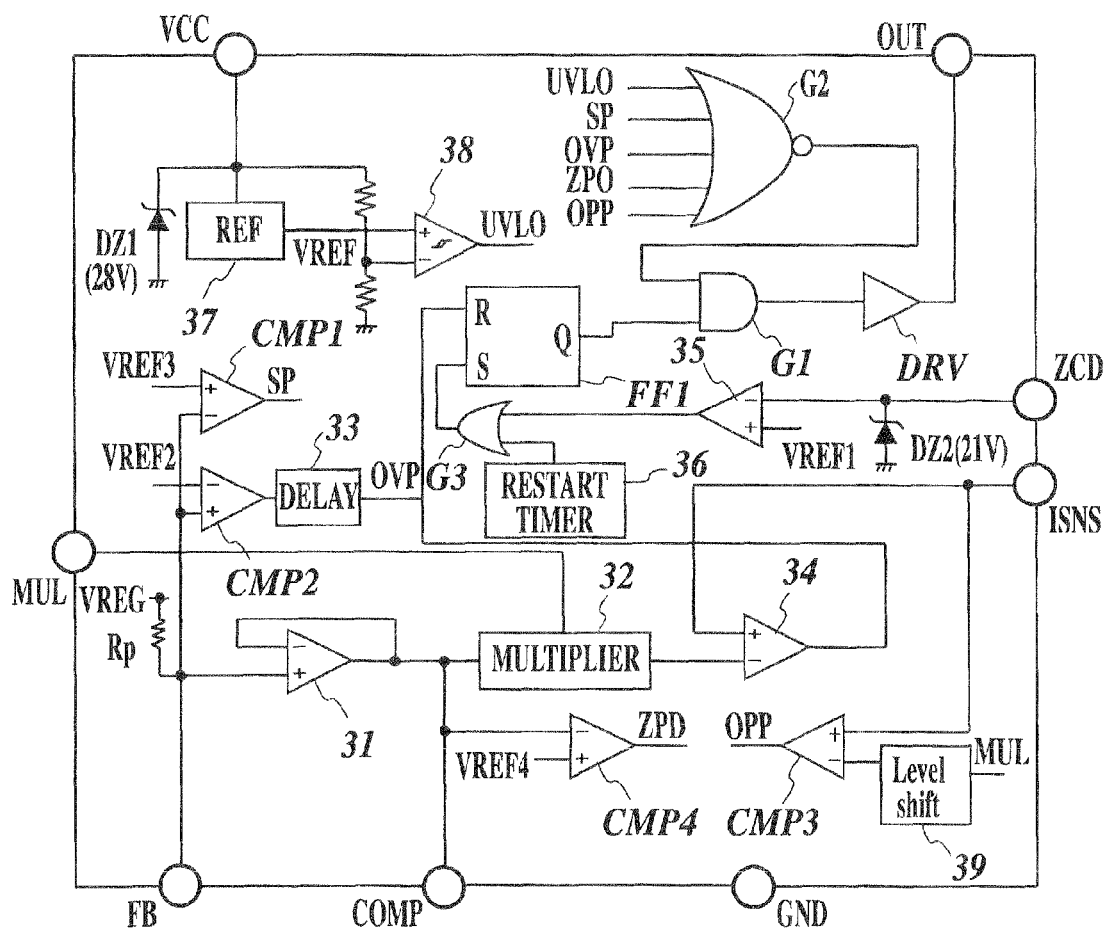
FIG. 3 is a block diagram showing an internal configuration example of a power source controlling IC on the primary side which IC constitutes the insulated AC-DC converter of FIG. 1.

FIG. 3 shows an internal configuration example of the power source controlling IC 13.

The power source controlling IC 13 is, as shown in FIG. 3, provided with a ground terminal GND to which the ground potential is applied from the outside; an terminal MUL to which a voltage obtained by dividing an input voltage Vin rectified by the diode bridge circuit 12 with resistors R1 and R2 is input; a terminal ISNS to which a voltage obtained by converting a current flowing through the primary side winding Np of the transformer T1 with a sense resistor Rs1 is applied; a terminal ZCD to which a voltage of one terminal of the auxiliary winding Nb is applied; an output terminal OUT from which an on/off drive signal ON/OFF of the switching transistor SW is output; and a terminal COMP to which an externally connected capacitor is connected; in addition to the power source voltage terminal VCC, as external terminals. Zener diodes DZ1 and DZ2 for clamping the potentials of the terminals VCC and ZCD, respectively, lest the potentials of the terminals VCC and ZCD should become equal to or more than predetermined levels are connected to the terminals VCC and ZCD, respectively, among the external terminals mentioned above.

The power source controlling IC 13 is provided inside with a buffer amplifier (voltage follower) 31 composed of an operational amplifier having a non-inverting input terminal connected to the feedback terminal FB and an inverting input terminal connected to the output terminal thereof; a multiplier 32 performing the multiplication of an output voltage (feedback voltage from the secondary side) of the buffer amplifier 31 and a voltage input to the external terminal MUL; a comparator 34 comparing a voltage (current detection signal) input to the external terminal ISNS and an output of the multiplier 32; a reset-set (RS) flip-flop FF1 reset by an output of the comparator 34; a comparator 35 comparing a voltage (induced voltage by the auxiliary winding Nb) input into the terminal ZCD and the reference voltage VREF1, e.g. 1.5 V, and generating a pulse at a timing at which a current of the auxiliary winding Nb has decreased to some extent to set the flip-flop FF1; an AND gate G1 to which an output of the flip-flop FF1 is input and which generates an on-off control signal of the switching transistor SW; and a driver DRV generating and outputting the drive signal ON/OFF for turning on and off the switching transistor SW in accordance with an output of the AND gate G1. To put it concretely, the drive signal ON/OFF is generated in order that when the flip-flop FF1 is set, the switching transistor SW is turned on, and that when the flip-flop FF1 is reset, the switching transistor SW is turned off.

The power source controlling IC 13 of this embodiment controls an on-time of the switching transistor SW in accordance with the feedback voltage from the secondary side, and thereby makes it possible to drive the LEDs as the loads by making a constant current flow through them. In parallel, the power source controlling IC 13, as described above, compares a voltage of a product of a voltage obtained by dividing the input voltage Vin with the resistors R1 and R2 and a feedback voltage from the secondary side with a voltage obtained by converting a current flowing through the primary side winding Np with the comparator 34 to control the duty (pulse width) of the on-off control signal of the switching transistor SW, and the power source controlling IC 13 turns on the switching transistor SW at the timing according to the voltage induced in the auxiliary winding Nb wound into the same direction as that of the secondary side winding Ns. The power source controlling IC 13 can, consequently, improve the power factor in comparison with the case of controlling the duty (pulse width) of the on-off control signal of the switching transistor SW in accordance with only the feedback voltage from the secondary side.

In addition, the power source controlling IC 13 of this embodiment is provided inside with a restart timer circuit 36 generating a signal for setting the flip-flop FF1 to generate an on-off controlling pulse of the switching transistor SW even at a time before the induction of a voltage in the auxiliary winding Nb at the time of a power source start, an internal power source circuit 37 generating the reference voltage VREF in the IC 13, and a low-voltage detecting circuit 38 connected to the external terminal VCC to monitor whether the voltage of the terminal VCC is equal to or more than a predetermined voltage, e.g. 9-13 V, or not. An output of the low-voltage detecting circuit 38 is input into the AND gate G1 through a NOR gate G2, and the low-voltage detecting circuit 38 is adapted in order that, when the voltage at the terminal VCC becomes equal to or less than 9 V, the output of the NOR gate G2 may be changed to the low level lest the on-off control signal (pulse) of the switching transistor SW should be supplied to the driver DRV to stop the operation of the AC-DC converter.

Furthermore, the power source controlling IC 13 of this embodiment is provided inside with a comparator CMP1 comparing the voltage of the feedback terminal FB and the reference voltage VREF3, e.g. 0.5 V, to judge whether or not the terminal FB has a potential near to the ground potential, i.e. whether or not the light receiving transistor 15b of the photocoupler 15 is in a strong on-state; and a comparator CMP2 comparing the voltage of the feedback terminal FB and the reference voltage VREF2, e.g. 3.5 V, to judge whether or not the terminal FB has a potential near to the internal reference voltage, i.e. whether or not the light receiving transistor 15b of the photocoupler 15 is in an off-state.

Incidentally, an output of the comparator CMP2 is adapted to be supplied to the NOR gate G2 after being delayed by a delay circuit 33 for a predetermined time to prohibit the output of the switching control signal. Thereby, even if no signals from the photocoupler 15 are input at an activation time of the AC power source and the comparator CMP2 erroneously judges that the output terminals OUT1 and OUT2 are in a short circuit state because the potential of the feedback terminal FB is the reference voltage VREF, it can be evaded to immediately prohibit the outputting of the switching control signal. That is, it is unnecessary to invalidate the protection function of the short circuit of the output terminals OUT1 and OUT2 at the time of AC power source activation. In addition, if the output terminals OUT1 and OUT2 are in the short circuit state at the time of the AC power source activation, the switching transistor SW once operates and a voltage on the secondary side rises to make the detecting IC 14 operate normally owing to the existence of the delay circuit 33. After that, the comparator CMP2, then, becomes the state in which no signals enter the comparator CMP2 from the photocoupler 15, and the comparator CMP2 consequently judges the output terminal short circuit state to be enabled to prohibit the outputting of the switching control signal.

In addition, the power source controlling IC 13 of this embodiment is provided inside with a comparator CMP3 judging whether the DC power source device 10 is in an overpower state or not by comparing a potential obtained by shifting a voltage (potential obtained by dividing the input voltage Vin with the resistors R1 and R2) input into the external terminal MUL with an inversely-proportional level shift circuit 39 with an voltage (current detection signal) input into the external terminal ISNS, and a comparator CMP4 judging whether the power on the secondary side is zero or not by comparing an output of the buffer amplifier 31 with the reference voltage VREF4. The level shift circuit 39 outputs a voltage in inverse proportion to the voltage of the external terminal MUL.

The operation of the comparators CMP1-CMP3 in the power source controlling IC 13, having the configuration described above, will next be described with reference to FIGS. 4-6.

Figure 4:
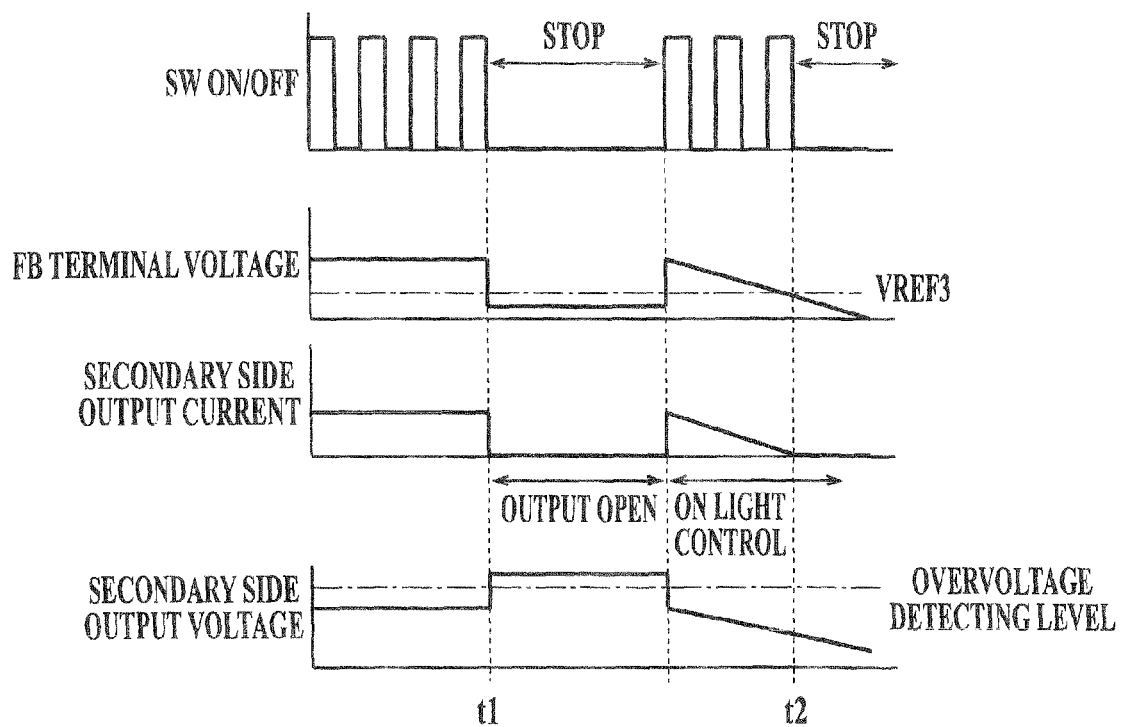
FIG. 4 is a timing chart showing the changing states of a switching control signal, the voltage of a feedback terminal, a secondary side output current, and a secondary side output voltage at the time of output open and at the time of narrowing down light control in the insulated AC-DC converter of the embodiment.

As shown in FIG. 4, when the output terminals OUT1 and OUT2 on the secondary side are in an open state during the normal operation of the AC-DC converter by, e.g. the removal of the LEDs, and the output voltage Vout becomes equal to or higher than a predetermined voltage (timing t1), then the output of the comparator 42 changes to the low level to make a current flow through the light emitting diode 15a of the photocoupler 15 to a limit. When the voltage of the feedback terminal FB of the power source controlling IC 13, then, becomes lower than the reference voltage VREF3, e.g. 0.5 V, owing to a voltage drop of the pull-up resistor Rp, the output SP of the comparator CMP1 changes to the high level to close the AND gate G1 through the NOR gate G2. The on-off drive signal ON/OFF for the switching transistor SW is, hereby, not output to stop the switching operation thereof.

In addition, also when the light control of the LEDs is narrowed down too much by lowering the reference voltage VREF1 of the detecting IC 14 on the secondary side, the potential of the feedback terminal FB lowers according to the light control. As a result, when the potential of the feedback terminal FB has lowered to be equal to or lower than the threshold value in the IC 13, set to be a low potential, e.g. 0.5 V, (timing t2), the comparator CMP1 detects the lowering and operates to stop the on-off drive control of the switching transistor SW, and the detecting IC 14 stops the operation thereof before entering into an operating limit region. Thereby, abnormal operation, such as the blinking of the LEDs, can be evaded.

Figure 5:
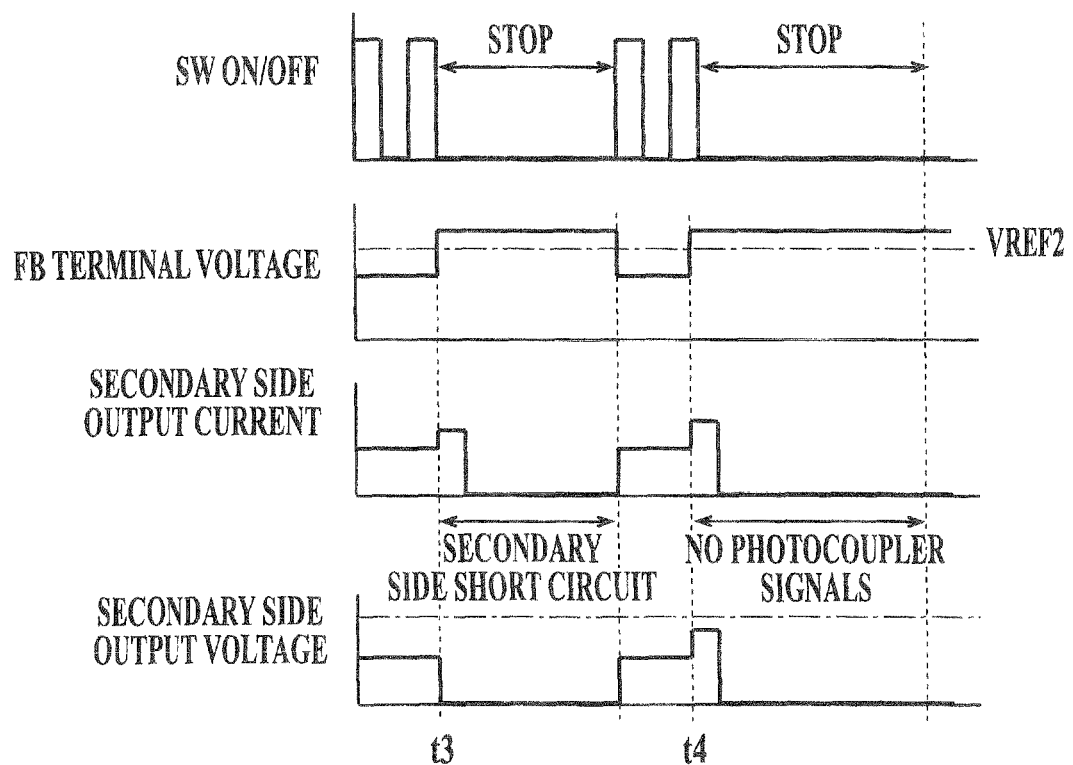
FIG. 5 is a timing chart showing the changing states of the switching control signal, the voltage of the feedback terminal, the secondary side output current, and the secondary side output voltage at the time of a short circuit between the secondary side output terminals and at the time of existing no signals in the photocoupler in the insulated AC-DC converter of the embodiment.

Next, when the output terminals OUT1 and OUT2 on the secondary side short-circuit during the normal operation of the AC-DC converter as shown in FIG. 5, the output voltage Vout on the secondary side lowers (timing t3). Consequently, the output voltage of the comparator 42 changes to the high level, and no voltage differences exist between both the terminals of the sense resistor Rs2 to heighten the output voltage of the error amplifier 41. The light emitting diode 15a of the photocoupler 15 is thus put out. The current flowing through the light receiving transistor 15b and the pull-up resistor Rp, hereby, decreases to heighten the voltage of the feedback terminal FB to the internal reference voltage VREF through the pull-up resistor Rp. The comparator CMP2, then, detects the heightening to change the output OVP of the delay circuit 33 to the high level after a predetermined delay time, and to close the AND gage G1 through the NOR gate G2. The on-off drive signal ON/OFF for the switching transistor SW, hereby, becomes not to be output to stop the on-off drive control of the switching transistor SW.

In addition, also when a connection wiring of the photocoupler 15 on the secondary side snaps, the light emitting diode 15a of the photocoupler 15 puts out, and no current flows through the light receiving transistor 15b and the pull-up resistor Rp to heighten the voltage of the feedback terminal FB to the internal reference voltage VREF (timing t4 in FIG. 5). The comparator CMP2, then, detects the heightening to stop the on-off drive control of the switching transistor SW.

As described above, according to the AC-DC converter of the present embodiment, various abnormalities can be detected only by providing one photocoupler, and the number of the parts thereof can be decreased to enable the miniaturization of the device.

Next, the overpower protection function provided in the power source controlling IC 13 will be described.

The power source controlling IC 13 of the present embodiment judges whether the DC power source device 10 is in an overpower state or not by comparing the potential as a result of shifting the voltage (the potential obtained by dividing the input voltage Vin with the resistors R1 and R2) input into the external terminal MUL with the inversely proportional level shift circuit 39 with the voltage (current detection signal) input into the external terminal ISNS with the comparator CMP3. To put it concretely, the power source controlling IC 13 judges the voltage at the terminal ISNS with the potential shifted by the level shift circuit 39 as a threshold value Vth. When the voltage of the terminal ISNS, detected from a switching current Is flowing through the primary side winding Np with the sense resistor Rs1, exceeds the threshold value Vth, the power source controlling IC 13 judges the overpower state, and the output OPP of the comparator CMP3 changes to the high level to close the AND gate G1 through the NOR gate G2. The on-off drive control of the switching transistor SW, hereby, stops.

Figure 6:
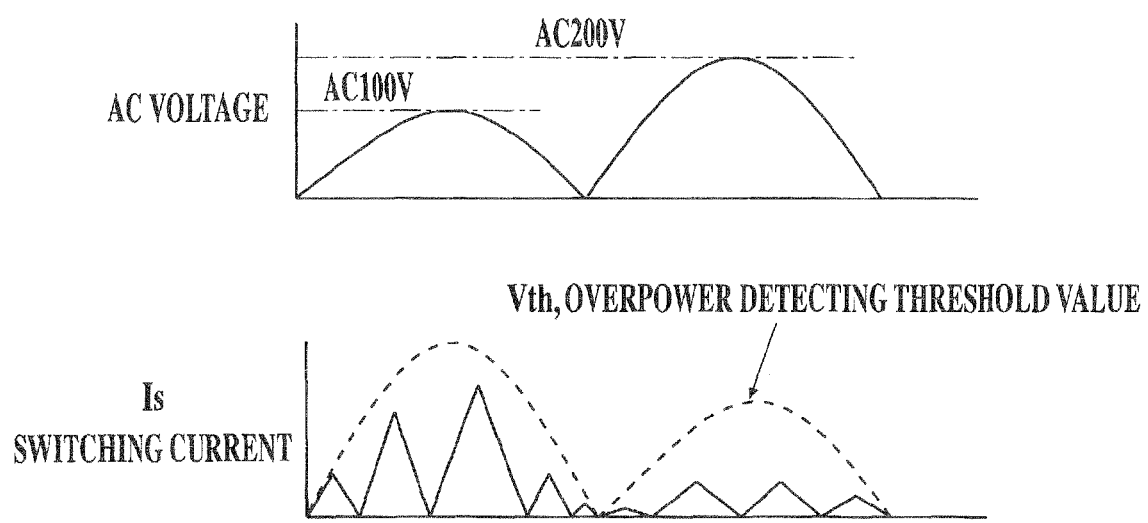
FIG. 6 is an explanatory diagram showing relations between the magnitudes of primary side input voltages and overpower detecting threshold values in the insulated AC-DC converter of the embodiment.

In the present embodiment, the smaller the amplitude of an AC input is, the higher the threshold value Vth generated by the input level shift circuit 39 is made to be, as shown in FIG. 6, and vice versa. In the power source controlling IC 13 of the present embodiment having the function of improving the power factor thereof, the switching transistor SW is driven in such a way that, the smaller the amplitude of an AC input is, the larger the current flowing through the primary side winding Np is made to be, and vice versa. Consequently, if the judging level (threshold value Vth) of overpower is constant independently of the amplitude of an AC input, the larger the amplitude of the AC input, the easier the judgment of an overpower state is.

On the other hand, in the present embodiment, the level shift circuit 39 makes the threshold value Vth for the detection of an overpower state higher when the amplitude of an AC input is smaller and lower when the amplitude of an AC input is larger according to the voltage input into the external terminal MUL as shown in FIG. 6. The sensitivity of the comparator CMP3 does, consequently, not depend on the magnitude of the amplitude of the input voltage Vin, and the present embodiment has an advantage of the capability of performing stable overpower judgment.

The invention made by the present inventors has been described above in detail on the basis of an embodiment. The present invention is, however, not limited to the aforesaid embodiment. For example, although the collector of the light receiving transistor 15b constituting the photocoupler 15 is connected to the terminal to which the internal reference voltage is applied through the pull-up resistor Rp in the aforesaid embodiment, the collector can be pulled up by a constant current source in place of the pull-up resistor Rp.

In addition, although the switching transistor SW making a current flow through the primary side winding Np of the transformer T1 intermittently is an element isolated from the power source controlling IC 13 in the embodiment, the switching transistor SW can be taken in the power source controlling IC 13 to be composed as one semiconductor integrated circuit. Furthermore, although the case where the present invention is applied to the DC power source device 10 driving the LEDs as loads has been described in the aforesaid embodiment, the present invention is not limited to the case where the loads are the LEDs, and the present invention can widely be applied to general DC power source devices driving their loads operating under DC power sources.

The entire disclosure of Japanese Patent Application No. 2010-038267 filed on Feb. 24, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A power source controlling semiconductor integrated circuit to control a current flowing through a primary side winding of a voltage converting transformer of an insulated direct-current power source device having the transformer, the circuit comprising:
    a first external terminal to which a detected voltage from a secondary side of the transformer is fed back through a photocoupler;
    a control circuit to generate and output a control signal of a switching element to control the current flowing through the primary side winding according to the voltage of the first external terminal and an input voltage applied to a terminal of the primary side winding of the transformer;
    a voltage generating circuit to generate an internal reference voltage based on the input voltage applied to the terminal of the primary side winding of the transformer;
    a pull-up section to be connected to the first external terminal to pull up a potential of the first external terminal to the internal reference voltage to enable giving a bias voltage to a light receiving element of the photocoupler, externally connected to the first external terminal;
    a first voltage comparing circuit having one input terminal connected to the first external terminal and another input terminal to which a first reference voltage is applied, wherein the control circuit is adapted to stop outputting the control signal based on an output of the first voltage comparing circuit when the voltage of the first external terminal is lower or higher than the first reference voltage;
    a second voltage comparing circuit having one input terminal connected to the first external terminal and another input terminal to which a second reference voltage of a potential higher than that of the first reference voltage is applied, wherein the control circuit is adapted to stop outputting the control signal based on the output of the first voltage comparing circuit and an output of the second voltage comparing circuit when the voltage of the first external terminal is lower than the first reference voltage or higher than the second reference voltage; and
    a delay circuit to delay the output of the second voltage comparing circuit, wherein the control circuit is adapted to delay stop control of the outputting in response to a signal from the delay circuit when the voltage of the first external terminal is judged to be higher than the second reference voltage by the second voltage comparing circuit.

2. The power source controlling semiconductor integrated circuit according to claim 1, further comprising:
    a second external terminal to which a voltage in proportion to the input voltage is input;
    a third external terminal to which a voltage according to the current flowing through the primary side winding of the transformer is input;
    a level shift circuit to output a voltage in inverse proportion to the voltage of the second external terminal; and
    a third voltage comparing circuit to detect an overpower state of an input by comparing the output voltage of the level shift circuit and the voltage of the third external terminal,
    wherein the control circuit is adapted to stop outputting the control signal based on an output of the third voltage comparing circuit when the voltage of the third external terminal is higher than the output voltage of the level shift circuit.

3. An insulated direct-current power source device including (i) a voltage converting transformer having a primary side winding, and (ii) the power source controlling semiconductor integrated circuit according to claim 1 to control the current flowing in the primary side winding of the voltage converting transformer, said insulating direct-current power source device comprising:
    a diode bridge circuit to rectify an alternating-current voltage to convert the voltage into a direct-current voltage, wherein the voltage rectified by the diode bridge circuit is input to the voltage converting transformer;
    a smoothing capacitor connected between terminals of a secondary side winding of the transformer;
    a rectifying section capable of charging the smoothing capacitor by converting an alternating current induced in the secondary side winding of the transformer into a direct current; and
    an output current detecting circuit to detect a current flowing through a load connected to a secondary side of the transformer and output a signal according to the detected current;
    wherein the photocoupler includes: (i) a light emitting element to be lighted and driven according to an output of the output current detecting circuit and (ii) the light receiving element to receive a light of the light emitting element to make a current according to a light quantity flow,
    wherein the light receiving element of the photocoupler is adapted to be connected between the first external terminal of the power source controlling semiconductor integrated circuit and a ground point, so that a bias voltage is given to the light receiving element through the pull-up section.

4. An insulated direct-current power source device including (i) a voltage converting transformer having a primary side winding, and (ii) the power source controlling semiconductor integrated circuit according to claim 1 to control the current flowing in the primary side winding of the voltage converting transformer, said insulating direct-current power source device comprising:
    a diode bridge circuit to rectify an alternating-current voltage to convert the voltage into a direct-current voltage, wherein the voltage rectified by the diode bridge circuit is input to the voltage converting transformer;

a smoothing capacitor connected between terminals of a secondary side winding of the transformer;

a rectifying section capable of charging the smoothing capacitor by converting an alternating current induced in the secondary side winding of the transformer into a direct current;

an output current detecting circuit to detect a current flowing through a load connected to a secondary side of the transformer and output a signal according to the detected current; and an output voltage detecting circuit to detect whether a charged voltage of the smoothing capacitor is higher than a predetermined voltage or not;

wherein the photocoupler includes: (i) a light emitting element to be lighted and driven according to an output of the output current detecting circuit and an output of the output voltage detecting circuit, and (ii) the light receiving element to receive a light of the light emitting element to make a current according to a light quantity flow, wherein the light receiving element of the photocoupler is adapted to be connected between the first external terminal of the power source controlling semiconductor integrated circuit and a ground point, so that a bias voltage is given to the light receiving element through the pull-up section.

5. The insulated direct current power source device according to claim 3, wherein the output current detecting circuit is adapted to include a voltage generating section to generate a reference voltage capable of changing a generated voltage and an error amplifying circuit having a first input terminal to which a voltage obtained by converting an output current by a resistor is applied, and a second input terminal to which the reference voltage is applied, and to change an output current by changing the reference voltage generated by the voltage generating section.

6. A power source controlling semiconductor integrated circuit to control a current flowing through a primary side winding of a voltage converting transformer of an insulated direct-current power source device having the transformer, the circuit comprising:

a first external terminal to which a detected voltage from a secondary side of the transformer is fed back through a photocoupler;

a control circuit to generate and output a control signal of a switching element to control the current flowing through the primary side winding according to the voltage of the first external terminal and an input voltage applied to a terminal of the primary side winding of the transformer;

a voltage generating circuit to generate an internal reference voltage based on the input voltage applied to the terminal of the primary side winding of the transformer;

a pull-up section to be connected to the first external terminal to pull up a potential of the first external terminal to the internal reference voltage to enable giving a bias voltage to a light receiving element of the photocoupler, externally connected to the first external terminal;

a first voltage comparing circuit having one input terminal connected to the first external terminal and another input terminal to which a first reference voltage is applied, wherein the control circuit is adapted to stop outputting the control signal based on an output of the first voltage comparing circuit when the voltage of the first external terminal is lower or higher than the first reference voltage;

a second external terminal to which a voltage in proportion to the input voltage is input;

a third external terminal to which a voltage according to the current flowing through the primary side winding of the transformer is input;

a level shift circuit to output a voltage in inverse proportion to the voltage of the second external terminal; and a third voltage comparing circuit to detect an overpower state of an input by comparing the output voltage of the level shift circuit and the voltage of the third external terminal, wherein the control circuit is adapted to stop outputting the control signal based on an output of the third voltage comparing circuit when the voltage of the third external terminal is higher than the output voltage of the level shift circuit.

7. The power source controlling semiconductor integrated circuit according to claim 6, further comprising:

a second voltage comparing circuit having one input terminal connected to the first external terminal and another input terminal to which a second reference voltage of a potential higher than that of the first reference voltage is applied, wherein the control circuit is adapted to stop outputting the control signal based on the output of the first voltage comparing circuit and an output of the second voltage comparing circuit when the voltage of the first external terminal is lower than the first reference voltage or higher than the second reference voltage.

8. An insulated direct-current power source device including (i) a voltage converting transformer having a primary side winding, and (ii) the power source controlling semiconductor integrated circuit according to claim 6 to control the current flowing in the primary side winding of the voltage converting transformer, said insulating direct-current power source device comprising:

a diode bridge circuit to rectify an alternating-current voltage to convert the voltage into a direct-current voltage, wherein the voltage rectified by the diode bridge circuit is input to the voltage converting transformer;

a smoothing capacitor connected between terminals of a secondary side winding of the transformer;

a rectifying section capable of charging the smoothing capacitor by converting an alternating current induced in the secondary side winding of the transformer into a direct current; and an output current detecting circuit to detect a current flowing through a load connected to a secondary side of the transformer and output a signal according to the detected current;

wherein the photocoupler includes: (i) a light emitting element to be lighted and driven according to an output of the output current detecting circuit and (ii) the light receiving element to receive a light of the light emitting element to make a current according to a light quantity flow, wherein the light receiving element of the photocoupler is adapted to be connected between the first external terminal of the power source controlling semiconductor integrated circuit and a ground point, so that a bias voltage is given to the light receiving element through the pull-up section.

9. An insulated direct-current power source device including (i) a voltage converting transformer having a primary side winding, and (ii) the power source controlling semiconductor integrated circuit according to claim 6 to control the current flowing in the primary side winding of the voltage converting transformer, said insulating direct-current power source device comprising:

a diode bridge circuit to rectify an alternating-current voltage to convert the voltage into a direct-current voltage, wherein the voltage rectified by the diode bridge circuit is input to the voltage converting transformer;

a smoothing capacitor connected between terminals of a secondary side winding of the transformer;

a rectifying section capable of charging the smoothing capacitor by converting an alternating current induced in the secondary side winding of the transformer into a direct current;

an output current detecting circuit to detect a current flowing through a load connected to a secondary side of the transformer and output a signal according to the detected current; and an output voltage detecting circuit to detect whether a charged voltage of the smoothing capacitor is higher than a predetermined voltage or not;

wherein the photocoupler includes: (i) a light emitting element to be lighted and driven according to an output of the output current detecting circuit and an output of the output voltage detecting circuit, and (ii) the light receiving element to receive a light of the light emitting element to make a current according to a light quantity flow, wherein the light receiving element of the photocoupler is adapted to be connected between the first external terminal of the power source controlling semiconductor integrated circuit and a ground point, so that a bias voltage is given to the light receiving element through the pull-up section.

10. The insulated direct current power source device according to claim 8, wherein the output current detecting circuit is adapted to include a voltage generating section to generate a reference voltage capable of changing a generated voltage and an error amplifying circuit having a first input terminal to which a voltage obtained by converting an output current by a resistor is applied, and a second input terminal to which the reference voltage is applied, and to change an output current by changing the reference voltage generated by the voltage generating section.

* * * * *